US012631315B2

(12) United States Patent
Miller et al.

(10) Patent No.: US 12,631,315 B2
(45) Date of Patent: May 19, 2026

(54) ATTACHMENT DEVICE FOR PROTECTIVE CAPS

(71) Applicants: Garrett Miller, Tunnel Hill, GA (US); Jonah Tyree, Ooltewah, TN (US)

(72) Inventors: Garrett Miller, Tunnel Hill, GA (US); Jonah Tyree, Ooltewah, TN (US)

(73) Assignee: One Hundred Concepts, LLC, McDonald, TN (US)

( * ) Notice: Subject to any disclaimer, the term of this patent is extended or adjusted under 35 U.S.C. 154(b) by 0 days.

Patent file contains an affidavit/declaration under 37 CFR 1.130(b).

(21) Appl. No.: 19/210,049

(22) Filed: May 16, 2025

(65) Prior Publication Data

US 2026/0022820 A1 Jan. 22, 2026

Related U.S. Application Data

(60) Provisional application No. 63/673,812, filed on Jul. 22, 2024.

(51) Int. Cl.
*F21V 17/16* (2006.01)
*F21V 15/00* (2015.01)

(52) U.S. Cl.
CPC ............ *F21V 17/162* (2013.01); *F21V 15/00* (2013.01)

(58) Field of Classification Search
CPC ...... F21V 23/0414; F41G 1/383; G02B 23/16
See application file for complete search history.

(56) References Cited

U.S. PATENT DOCUMENTS

| | | | | |
|---|---|---|---|---|
| 721,577 A | | 2/1903 | Lindner | |
| 3,426,433 A | * | 2/1969 | Anderson | F41G 1/383 42/129 |
| 3,496,642 A | * | 2/1970 | Pfahler | F41G 1/383 42/129 |
| 2018/0100722 A1 | * | 4/2018 | McDaniels | F41G 1/383 |

OTHER PUBLICATIONS

Hammy3dprints, Tip Grip—Flashlight and Scope Clamp, May 22, 2025, hammy3dprints (Year: 2024).*
Hammy3dprints (Year: 2024).*

* cited by examiner

*Primary Examiner* — Eric T Eide
(74) *Attorney, Agent, or Firm* — Asgaard Patent Services, LLC; F. Wayne Thompson, Jr.

(57) ABSTRACT

An attachment device for protective caps is disclosed. The attachment device is used in conjunction with an elastic cord to selectively position a protective cap over the lens of a device, such as a flashlight or a telescopic sight, and to retain the protective cap when it is displaced from its position covering the lens.

19 Claims, 8 Drawing Sheets

ATTACHMENT DEVICE FOR PROTECTIVE CAPS

CROSS-REFERENCE TO RELATED APPLICATION(S)

This application claims the benefit of U.S. Provisional Application Ser. No. 63/673,812, filed on Jul. 22, 2024, the entirety of which is incorporated herein by reference.

TECHNICAL FIELD

This disclosure relates to implementations of an attachment device for protective caps.

BACKGROUND

Protective caps, including caps that incorporate a diffusor or a clear or colored lens, are routinely employed to shield lenses of various optical devices, such as flashlights, optical sights, and telescopic sights, from environmental contaminants, physical damage, and unintended exposure. Conventional protective caps are frequently detachable and thus easily misplaced or lost, particularly during field use. Retention methods currently employed, such as tethers or cords attached directly to the device body, often fail to provide convenient repositioning or secure retention when the protective cap is removed from the lens.

Moreover, existing retention solutions frequently lack adjustability, adaptability to various device dimensions, or integration with existing equipment. For example, users of flashlights and telescopic sights often encounter difficulty securely affixing and repositioning protective lens caps during rapid deployment or in rugged environments. Additionally, current approaches typically do not offer an integrated, easily adjustable system that permits secure retention of the protective cap in multiple positions relative to the lens.

Accordingly, there is a need for the attachment device for protective caps disclosed herein. The present invention is directed to providing an attachment device configured to address these and other needs.

SUMMARY OF THE INVENTION

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

An attachment device for protective caps is disclosed. The attachment device is used in conjunction with an elastic cord to selectively position a protective cap over the lens of a device, such as a flashlight or a telescopic sight, and to retain the protective cap when it is displaced from its position covering the lens.

An example attachment device comprises a clamp ring defining a central opening configured to receive and frictionally engage a portion of the device adjacent to the lens; a split defined in the clamp ring between two opposed ends, wherein the split permits adjustment of a diameter of the clamp ring; a fastener assembly operably coupled to the two opposed ends and configured to selectively tighten the clamp ring around the portion of the device, thereby securing the clamp ring against unintended movement relative to the device; and at least two projections extending laterally from the clamp ring, each projection configured to act as an attachment point.

Another example attachment device comprises a clamp ring defining a central opening configured to receive and frictionally engage a portion of the device adjacent to the lens; a split defined in the clamp ring between two opposed ends, wherein the split permits adjustment of a diameter of the clamp ring; a fastener assembly operably coupled to the two opposed ends and configured to selectively tighten the clamp ring around the portion of the device, thereby securing the clamp ring against unintended movement relative to the device; and at least two projections extending laterally from the clamp ring, each projection defining an aperture extending therethrough.

Yet another example attachment device comprises a clamp ring defining a central opening configured to receive and frictionally engage a portion of the device adjacent to the lens; a split defined in the clamp ring between two opposed ends, wherein the split permits adjustment of a diameter of the clamp ring; a fastener assembly operably coupled to the two opposed ends and configured to selectively tighten the clamp ring around the portion of the device, thereby securing the clamp ring against unintended movement relative to the device; at least two projections extending laterally from the clamp ring, each projection defining an aperture extending therethrough; and an elastic cord configured to couple the protective cap to the clamp ring, the elastic cord having a first end and a second end, wherein the first end extends through the aperture defined by a first one of the projections and through a corresponding first aperture defined in the protective cap, and the second end extends through the aperture defined by a second one of the projections and through a corresponding second aperture defined in the protective cap, wherein each end of the elastic cord includes a stopper knot configured to retain the elastic cord in a secured position. The elastic cord is configured to selectively position and retain the protective cap either in a first position covering the lens or in a second position displaced from the lens.

Still another example attachment device comprises at least two projections integrally formed with and extending laterally from opposite sides of a removable flashlight head, each projection defining an aperture extending therethrough; and an elastic cord configured to couple the protective cap to the removable flashlight head. The elastic cord having a first end and a second end. The first end extends through the aperture defined by a first one of the projections and through a corresponding first aperture defined in the protective cap, and the second end extends through the aperture defined by a second one of the projections and through a corresponding second aperture defined in the protective cap. Each end of the elastic cord includes a stopper knot configured to retain the elastic cord in a secured position. The elastic cord is configured to selectively position and retain the protective cap either in a first position covering the lens or in a second position displaced from the lens.

BRIEF DESCRIPTION OF THE DRAWINGS

Like reference numerals refer to corresponding parts throughout the several views of the drawings.

DETAILED DESCRIPTION

Figure 1:
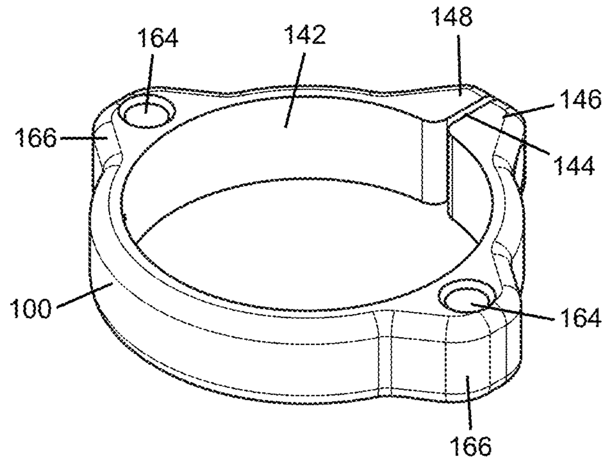
FIG. 1 is a perspective view of an attachment device according to the principles of the present disclosure.
Figure 2:
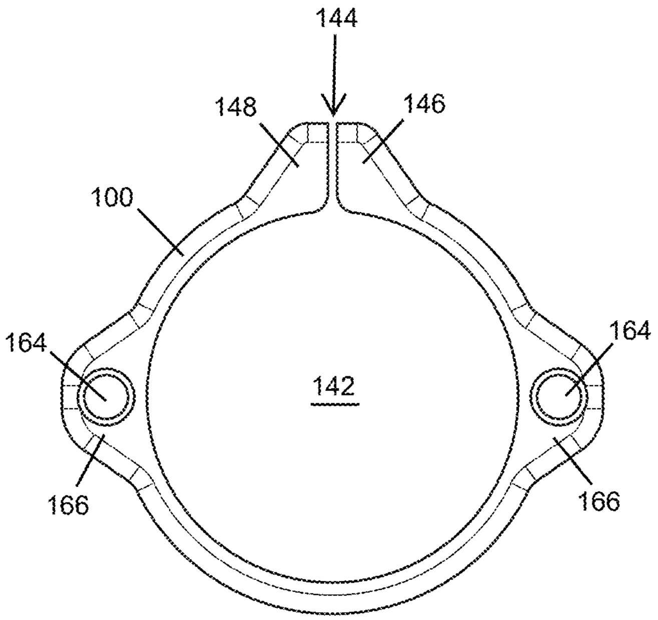
FIG. 2 is a plan view of the attachment device shown in FIG. 1.
Figure 3:
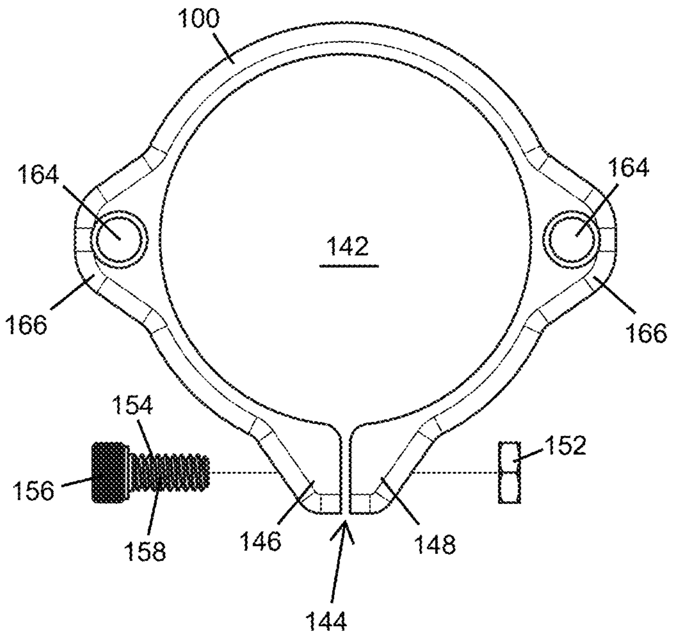
FIG. 3 is an exploded plan view of the attachment device shown in FIG. 1.
Figure 4:
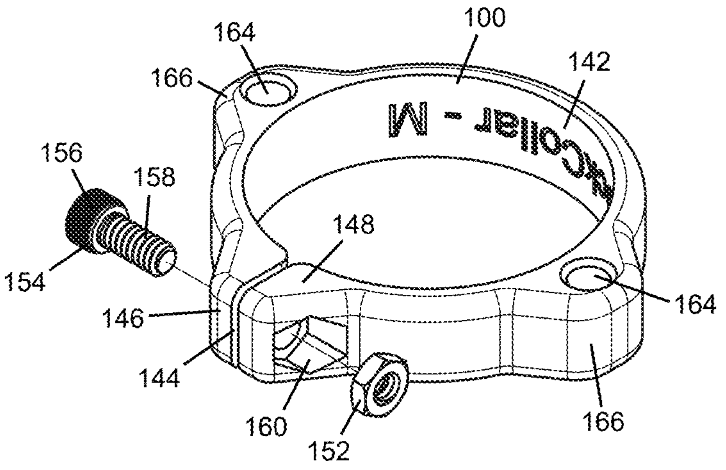
FIG. 4 is an exploded perspective view of the attachment device shown in FIG. 1.
Figure 5:
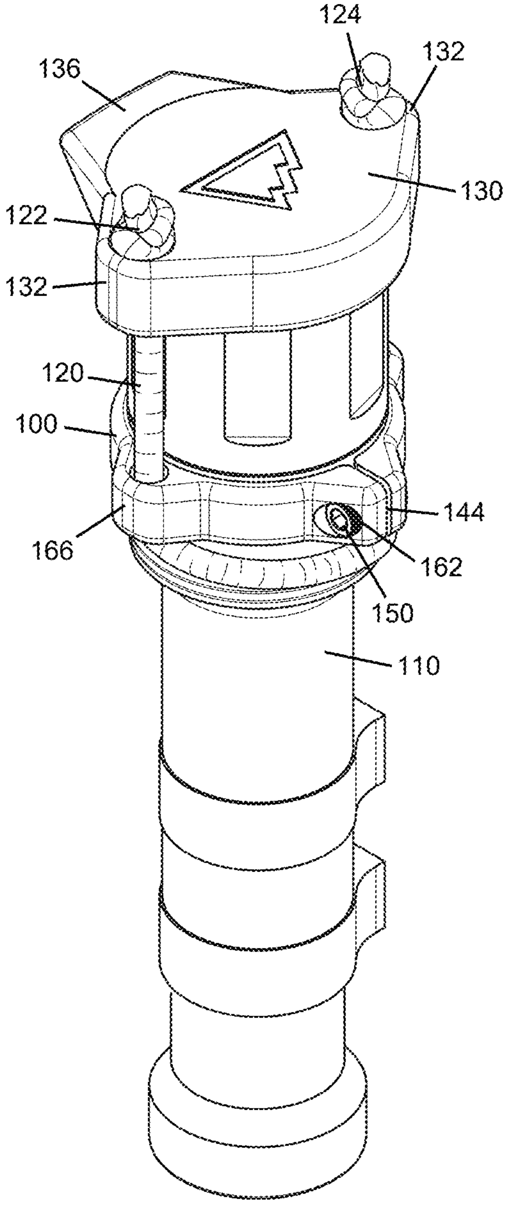
FIG. 5 is a perspective view of a flashlight equipped with a protective cap, which is held in position over the lens of the light head by an elastic cord and the attachment device shown in FIG. 1.
Figure 6:
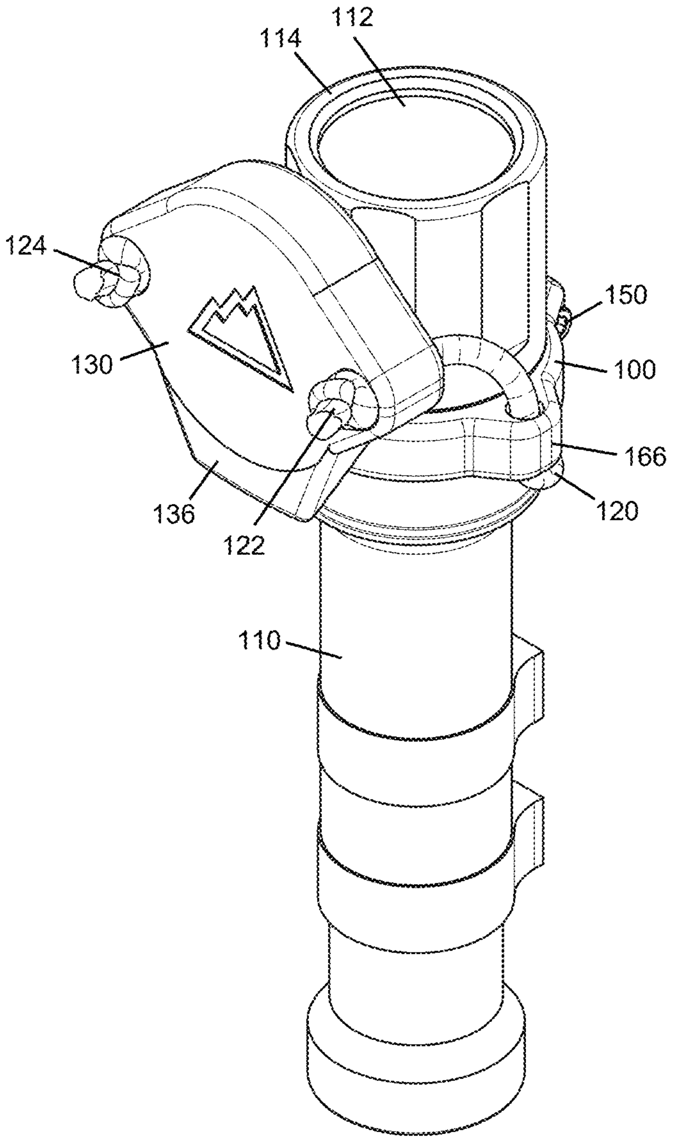
FIG. 6 is a perspective view of the flashlight, protective cap, elastic cord, and attachment device shown in FIG. 5, wherein the protective cap has been displaced from its position covering the lens of the light head.

FIGS. 1-4 illustrate an attachment device 100 for protective caps according to the principles of the present disclosure. FIGS. 5 and 6 illustrate the attachment device 100 affixed to a flashlight 110. The attachment device 100 is used in conjunction with an elastic cord 120 to selectively position a protective cap 130 over the lens 112 of the flashlight 110 (see FIG. 5) and to retain the protective cap 130 near the bezel 114 when it is displaced from its position covering the lens 112 (see FIG. 6).

As shown best in FIGS. 1-4, the example attachment device 100 is a clamp ring. The clamp ring 100 defines a central opening 142 configured to receive and engage an accessory, such as a light head 116 of a flashlight 110 or a tube of a telescopic sight. The clamp ring 100 includes a split 144 defined between two opposed ends 146, 148. The split 144 allows the clamp ring 100 to be slightly opened in order to receive the accessory. A fastener assembly 150 is provided and used to draw the two opposed ends 146, 148 of the clamp ring 100 together, thereby developing a clamping force sufficient to secure the clamp ring 100 against sliding off the accessory. The fastener assembly 150 comprises a nut 152 and a bolt 154. The nut 152 is nested within a receptacle 160 formed in one end 146 of the clamp ring 100, and the head 156 of the bolt 154 is positioned within a counterbore 162 formed in the opposed end 148 of the clamp ring 100. The threaded end 158 of the bolt 154 extends through the opposed end 146 of the clamp ring 100 to removably couple with the nut 152 nested in the receptacle 160. The clamp ring 100 also includes a pair of apertures 164 positioned on opposite sides of the central opening 142, the purpose of which will be described in detail below. Each aperture 164 is a round opening that extends through the clamp ring 100. More specifically, each aperture 164 extends through a laterally extending projection 166 of the clamp ring 100. The clamp ring 100 is made of thermoplastic polyurethane (TPU), though the clamp ring 100 can be made of any suitable material, such as polyamide 12 (PA12).

The protective cap 130 is removably positioned for covering the lens 112 of the flashlight 110 by the elastic cord 120. The protective cap 130 includes two projections 132 that extend laterally from opposite sides. Each projection 132 includes an aperture, the purpose of which will be described in detail below. Each aperture is a round opening extending through one of the projections 132. The protective cap 130 also includes a laterally extending flipper tab 136. The flipper tab 136 is configured for use in dislodging the protective cap 130 from the bezel 114 of the flashlight 110. The protective cap 130 is made of thermoplastic polyurethane (TPU), though the protective cap 130 can be made of any suitable material, such as polyamide 12 (PA12).

As previously described, the elastic cord 120 is used to selectively position the protective cap 130 over the lens 112 of the light head 116 (see FIG. 5) and to retain the protective cap 130 near the bezel 114 when it is displaced from its position covering the lens 112. The elastic cord 120 is a length of 2.5 mm shock cord, although other thicknesses may also be suitable. Each end 122, 124 of the elastic cord 120 extends through a pair of apertures; one aperture 164 in the clamp ring 100 and one aperture in the protective cap 130. Each end 122, 124 of the elastic cord 120 includes a stopper knot, preferably an overhand knot, that prevents the elastic cord 120 from unreeving. When the protective cap 130 is displaced from the bezel 114 of the flashlight 110, the elastic cord 120 is positioned and configured to draw the protective cap 130 against the side of the light head 116.

Figure 7:
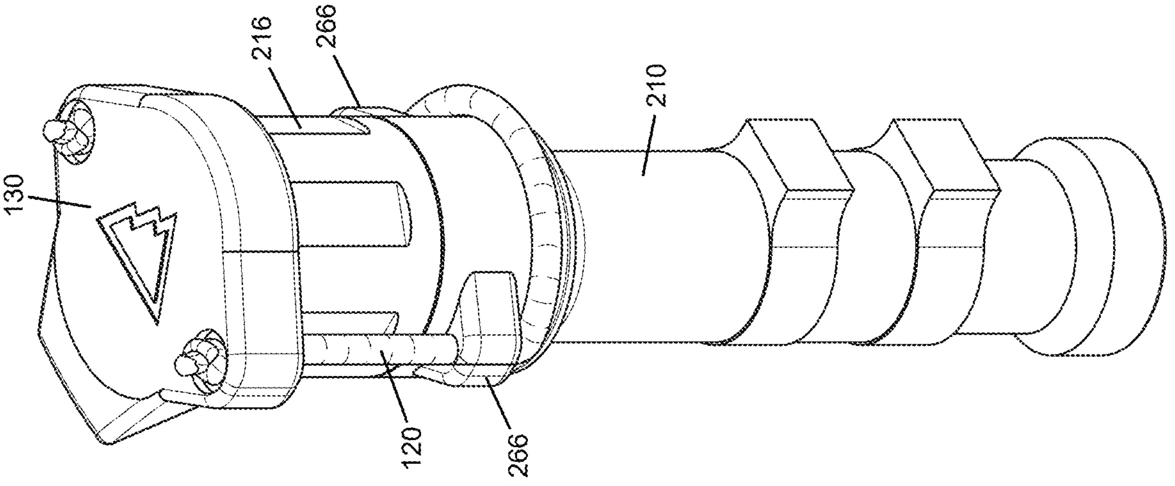
FIG. 7 is a perspective view of a flashlight equipped with another attachment device according to the principles of the present disclosure, and a protective cap held in position over the lens of the light head by an elastic cord threaded through apertures of the attachment device.
Figure 8:
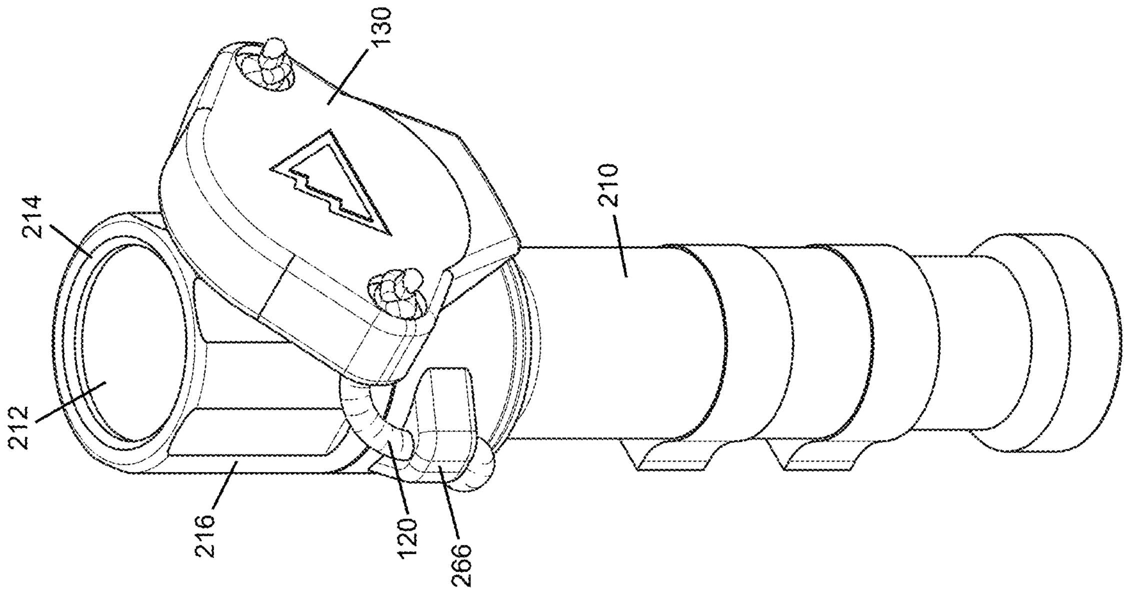
FIG. 8 is a perspective view of the flashlight, attachment device, protective cap, and elastic cord shown in FIG. 7, wherein the protective cap has been displaced from its position covering the lens of the light head.
Figure 10:
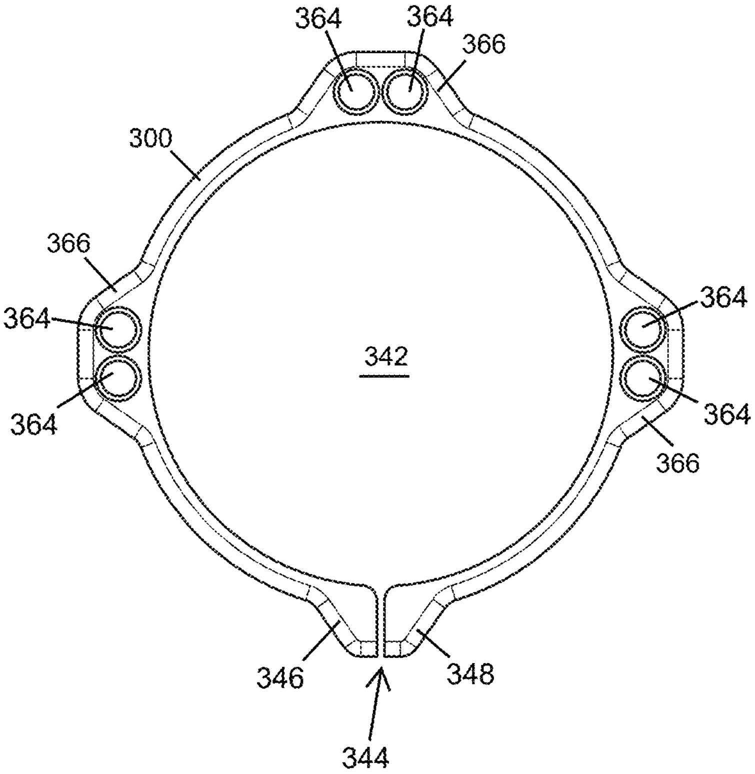
FIG. 10 is a plan view of the attachment device shown in FIG. 9.
Figure 9:
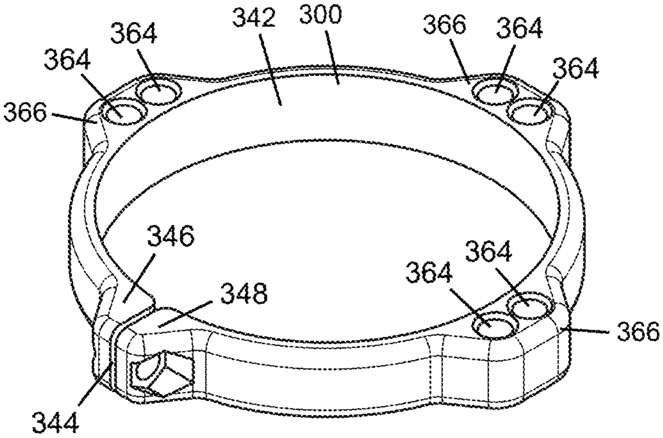
FIG. 9 is a perspective view of yet another attachment device according to the principles of the present disclosure.
Figure 11:
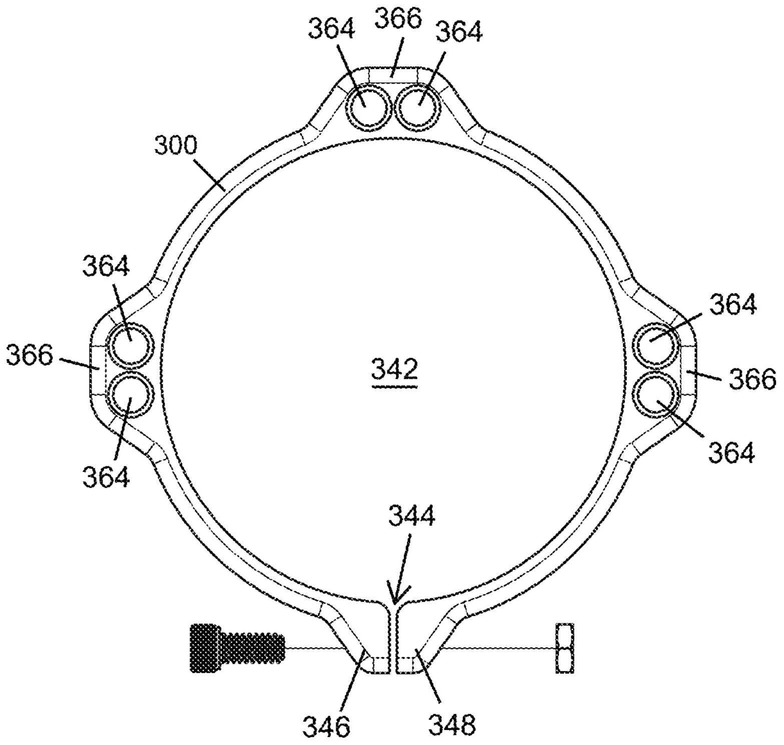
FIG. 11 is an exploded plan view of the attachment device shown in FIG. 9.
Figure 12:
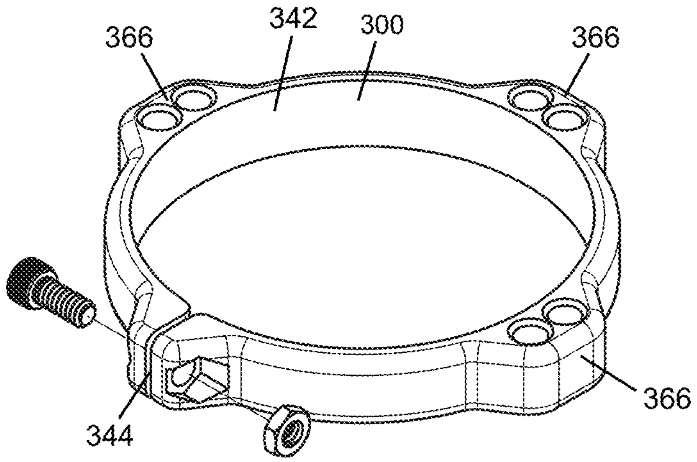
FIG. 12 is an exploded perspective view of the attachment device shown in FIG. 9.

FIGS. 7 and 8 illustrate another attachment device 200 for protective caps according to the principles of the present disclosure. Illustrated is a flashlight 210 that includes an attachment device 200 comprising a pair of projections 266 disposed on opposite sides of a removable light head 216, each projection 266 defining an aperture. The projections 266 are an integral part of the light head 216. The apertures of the attachment device 200 are used in conjunction with the elastic cord 120 to selectively position the protective cap 130 over the lens 212 of the flashlight 210 (see FIG. 7) and to retain the protective cap 130 near the bezel 214 when it is displaced from its position covering the lens 212 (see FIG. 8).

FIGS. 9-12 illustrate yet another attachment device 300 for protective caps according to the principles of the present disclosure. The attachment device 300 is a clamp ring similar to the clamp ring 100 discussed above and shown in FIGS. 1-6, but this clamp ring 300 includes additional apertures 364. In particular, the clamp ring 300 includes three projections 366 that laterally extend from the clamp ring 300, each projection 366 including two apertures 364. Two of the projections 366 are positioned on opposite sides of the central opening 342, while the third projection 366 is positioned between the other two projections 366 and across from the split 344 defined between the two opposed ends 346, 348 of the clamp ring 300. The apertures 364 of the clamp ring 300 are used in conjunction with an elastic cord to selectively position a protective cap over either the objective lens or ocular lens of a telescopic sight, and to retain the protective cap near the bell when it is displaced from its position covering the lens.

The foregoing description of the present disclosure is intended to be illustrative; it is not intended to be exhaustive or to limit the claims to the precise forms disclosed. Those skilled in the relevant art can appreciate that many modifications and variations are possible in light of the foregoing description and associated drawings.

Reference throughout this specification to an "embodiment" or "implementation" or words of similar import means that a particular described feature, structure, or characteristic is included in at least one embodiment of the present disclosure. Thus, the phrase "in some implementations" or a phrase of similar import in various places throughout this specification does not necessarily refer to the same embodiment.

The described features, structures, or characteristics may be combined in any suitable manner in one or more embodiments. In the above description, numerous specific details are provided for a thorough understanding of embodiments of the present disclosure. One skilled in the relevant art will recognize, however, that embodiments of the present disclosure can be practiced without one or more of the specific details, or with other methods, components, materials, etc. In other instances, well-known structures, materials, or operations may not be shown or described in detail.

The invention claimed is:

1. An attachment device for securing a protective cap to a device having a lens, the attachment device comprising:
- a clamp ring defining a central opening configured to receive and frictionally engage a portion of the device adjacent to the lens;
- a split defined in the clamp ring between two opposed ends, wherein the split permits adjustment of a diameter of the clamp ring;
- a fastener assembly operably coupled to the two opposed ends and configured to selectively tighten the clamp ring around the portion of the device, thereby securing the clamp ring against unintended movement relative to the device; and
- at least two projections extending laterally from the clamp ring, each projection configured to act as an attachment point.

2. The attachment device of claim 1, wherein the at least two projections extend laterally from opposite sides of the clamp ring.

3. The attachment device of claim 1, further comprising at least one elastic cord configured to couple the protective cap to the clamp ring, the at least one elastic cord extending from one of the projections to an attachment point on the protective cap.

4. An attachment device for securing a protective cap to a device having a lens, the attachment device comprising:
- a clamp ring defining a central opening configured to receive and frictionally engage a portion of the device adjacent to the lens;
- a split defined in the clamp ring between two opposed ends, wherein the split permits adjustment of a diameter of the clamp ring;
- a fastener assembly operably coupled to the two opposed ends and configured to selectively tighten the clamp ring around the portion of the device, thereby securing the clamp ring against unintended movement relative to the device; and
- at least two projections extending laterally from the clamp ring, each projection defining an aperture extending therethrough.

5. The attachment device of claim 4, wherein the at least two projections extend laterally from opposite sides of the clamp ring.

6. The attachment device of claim 4, wherein the clamp ring comprises three projections extending laterally from the clamp ring, each projection defining two apertures extending therethrough, wherein two of the projections are disposed on opposite sides of the central opening, and the third projection is disposed between the two projections and opposite the split defined in the clamp ring.

7. An attachment device for securing a protective cap to a device having a lens, the attachment device comprising:
- a clamp ring defining a central opening configured to receive and frictionally engage a portion of the device adjacent to the lens;
- a split defined in the clamp ring between two opposed ends, wherein the split permits adjustment of a diameter of the clamp ring;
- a fastener assembly operably coupled to the two opposed ends and configured to selectively tighten the clamp ring around the portion of the device, thereby securing the clamp ring against unintended movement relative to the device;
- at least two projections extending laterally from the clamp ring, each projection defining an aperture extending therethrough; and
- an elastic cord configured to couple the protective cap to the clamp ring, the elastic cord having a first end and a second end, wherein the first end extends through the aperture defined by a first one of the projections and through a corresponding first aperture defined in the protective cap, and the second end extends through the aperture defined by a second one of the projections and through a corresponding second aperture defined in the protective cap, wherein each end of the elastic cord includes a stopper knot configured to retain the elastic cord in a secured position;
- wherein the elastic cord is configured to selectively position and retain the protective cap either in a first position covering the lens or in a second position displaced from the lens.

8. The attachment device of claim 7, wherein the at least two projections extend laterally from opposite sides of the clamp ring.

9. The attachment device of claim 7, wherein the clamp ring comprises three projections extending laterally from the clamp ring, each projection defining two apertures extending therethrough, wherein two of the projections are disposed on opposite sides of the central opening, and the third projection is disposed between the two projections and opposite the split defined in the clamp ring.

10. An attachment device for securing a protective cap to a removable flashlight head having a lens, the attachment device comprising:
- at least two projections integrally formed with and extending laterally from opposite sides of the removable flashlight head, each projection defining an aperture extending therethrough; and
- an elastic cord configured to couple the protective cap to the removable flashlight head, the elastic cord having a first end and a second end, wherein the first end extends through the aperture defined by a first one of the projections and through a corresponding first aperture defined in the protective cap, and the second end extends through the aperture defined by a second one of the projections and through a corresponding second aperture defined in the protective cap;
- wherein each end of the elastic cord includes a stopper knot configured to retain the elastic cord in a secured position; and
- wherein the elastic cord is configured to selectively position and retain the protective cap either in a first position covering the lens or in a second position displaced from the lens.

11. The attachment device of claim 10, wherein the removable light head comprises three projections integrally formed with and extending laterally from the removable flashlight head, each projection defining two apertures extending therethrough, wherein two of the projections are disposed on opposite sides of the removable flashlight head, and the third projection is disposed between the other two projections.

12. The attachment device of claim 1, wherein the fastener assembly comprises a nut and a bolt.

13. The attachment device of claim 12, wherein the nut is nested within a receptacle formed in a first one of the two opposed ends of the clamp ring.

14. The attachment device of claim 4, wherein each aperture is a round opening extending through the clamp ring.

15. The attachment device of claim 4, wherein the clamp ring is made of thermoplastic polyurethane.

16. The attachment device of claim 7, wherein the fastener assembly comprises a nut and a bolt.

17. The attachment device of claim 16, wherein a head of the bolt is positioned within a counterbore formed in one of the two opposed ends of the clamp ring.

18. The attachment device of claim 7, wherein the elastic cord comprises a shock cord.

19. The attachment device of claim 10, wherein each aperture is a round opening extending through a respective one of the at least two projections.

* * * * *